(12) United States Patent
Siegel et al.

(10) Patent No.: US 12,443,627 B2
(45) Date of Patent: Oct. 14, 2025

(54) CLUSTERING BASED ENTITY MATCHING USING MULTIPLE QUEUES

(71) Applicant: ZipRecruiter, Inc., Santa Monica, CA (US)

(72) Inventors: Ian Siegel, Los Angeles, CA (US); Tong Zhang, Santa Monica, CA (US); Kevin Huynh, Monrovia, CA (US); Ardalan Kaveh, Los Angeles, CA (US); David Farrell, Santa Monica, CA (US); Arina Itkes, Modi'In-Maccabim-Re'ut (IL); Boris Shimanovsky, Santa Monica, CA (US)

(73) Assignee: ZipRecruiter, Inc., Santa Monica, CA (US)

( * ) Notice: Subject to any disclaimer, the term of this patent is extended or adjusted under 35 U.S.C. 154(b) by 0 days.

(21) Appl. No.: 18/735,097

(22) Filed: Jun. 5, 2024

(65) Prior Publication Data

US 2024/0403331 A1    Dec. 5, 2024

Related U.S. Application Data

(60) Provisional application No. 63/471,028, filed on Jun. 5, 2023.

(51) Int. Cl.
*G06F 16/00* (2019.01)
*G06F 9/48* (2006.01)
*G06F 11/34* (2006.01)
*G06F 16/28* (2019.01)

(52) U.S. Cl.
CPC .......... *G06F 16/285* (2019.01); *G06F 9/4881* (2013.01); *G06F 11/3409* (2013.01)

(58) Field of Classification Search
None
See application file for complete search history.

(56) References Cited

U.S. PATENT DOCUMENTS

| | | | |
|---|---|---|---|
| 10,311,086 B2 * | 6/2019 | Achtermann | G06F 16/355 |
| 11,501,042 B2 * | 11/2022 | Steingrimsson | G06Q 30/0202 |
| 11,599,592 B1 * | 3/2023 | Adams | G06F 16/906 |
| 2017/0004201 A1 * | 1/2017 | Snell | G06F 16/24534 |
| 2017/0272550 A1 * | 9/2017 | Rodriguez | H04L 67/1074 |
| 2020/0081899 A1 * | 3/2020 | Shapur | G06F 16/211 |
| 2020/0293216 A1 * | 9/2020 | Su | G06F 3/0604 |
| 2020/0320306 A1 * | 10/2020 | Tian | G10L 13/00 |

(Continued)

*Primary Examiner* — Hasanul Mobin
(74) *Attorney, Agent, or Firm* — Fenwick & West LLP (57) ABSTRACT

An online system matches source and target entities using multiple queues. The online system performs clustering of target entities to generate a plurality of clusters based on vector distances between pairs of target entities. Each cluster comprises target entities that are close to other target entities within the cluster compared to target entities of remaining clusters. The online system optimizes an aggregate score across the plurality of entities using a plurality of queues. Each queue is associated with a source entity and includes one or more target entities. The online system identifies a cluster of target entities based on a distance between the source entities and entities of the cluster of target entities. The online system selects a subset of target entities from the identified cluster using a machine learning based model trained to determine a score between an input source entity and target entity.

20 Claims, 7 Drawing Sheets

(56) References Cited

U.S. PATENT DOCUMENTS

| | | | | |
|---|---|---|---|---|
| 2021/0011880 A1* | 1/2021 | Marelas | ............. | G06F 11/1448 |
| 2021/0089899 A1* | 3/2021 | Bercich | ................. | G06N 3/084 |
| 2022/0317979 A1* | 10/2022 | Araujo Soares | .... | G06F 16/9024 |
| 2022/0398488 A1* | 12/2022 | Zhang | ................... | G06N 20/00 |
| 2023/0004316 A1* | 1/2023 | Bhowmik | ............ | G06F 9/5061 |
| 2024/0022514 A1* | 1/2024 | Maheshwari | ......... | H04W 28/08 |
| 2024/0095145 A1* | 3/2024 | Weber | ................. | G06F 11/3409 |
| 2024/0154831 A1* | 5/2024 | Carluccio | ........... | H04L 12/1822 |
| 2024/0403331 A1* | 12/2024 | Siegel | .................. | G06F 9/4881 |

* cited by examiner

CLUSTERING BASED ENTITY MATCHING USING MULTIPLE QUEUES

CROSS-REFERENCE TO RELATED APPLICATIONS

This application claims the benefit of U.S. Provisional Application No. 63/471,028, filed on Jun. 5, 2023, which is incorporated by reference herein in its entirety.

TECHNICAL FIELD

The disclosure generally relates to the field of clustering of data, and more particularly, to using clustering of entities for matching source and target entities using multiple queues.

BACKGROUND

Task scheduling systems manage distribution of tasks or jobs across multiple workers. Task scheduling techniques often used include first come first served strategy, round robin scheduling strategy, greedy scheduling strategies, and so on. Conventional techniques often have drawbacks making them unsuitable for certain applications. For example, greedy scheduling strategies make locally optimal choice at each step and may find suboptimal solutions. First come first served task scheduling strategies are simple to implement but may not perform well if the system aims to optimize the result based on domain specific criteria. In general, conventional scheduling techniques provide suboptimal results for applications that optimize domain specific criteria and manage multiple task queues. Such task scheduling strategies have impact on the performance on the overall system, thereby causing the system to fail to achieve an overall optimal goal.

SUMMARY

An online system matches source and target entities for performing tasks using multiple queues. The online system receives information identifying a plurality of source entities and a plurality of target entities. The online system maintains a plurality of queues, each queue associated with a source entity. Each queue comprises one or more target entities. A target entity is included in a queue based on matching of the target entity with a source entity. According to an embodiment, the online system performs matching using a machine learning model. Accordingly, the online system extracts a feature vector describing the source entity and the target entity, provides the feature vector as input to a machine learning model trained to determine a score between an input source entity and target entity, and executes the machine learning model to determine the score indicating a matching between the source entity and the target entity.

The online system may modify one or more queues to optimize an aggregate score across the plurality of source entities and the plurality of target entities. For example, moving target entities across queues may cause an aggregate score of a particular queue to decrease but improves the aggregate score of a plurality of queues.

The online system selects a particular target entity for a particular source entity from the queue corresponding to the source entity. The online system schedules an interaction between the particular source entity and the particular target entity. For example, the online system may identify a particular time interval for the interaction between the particular source entity and the particular target entity and send a message describing the interaction.

According to an embodiment, the online system receives information identifying a plurality of entities comprising source entities and target entities. For each of the plurality of entities, the online system generates a vector representation. The online system performs clustering of target entities to generate a plurality of clusters based on vector distances between pairs of target entities. Each cluster comprises target entities that are close to other target entities within the cluster compared to target entities of remaining clusters. The online system optimizes an aggregate score across the plurality of entities using a plurality of queues. Each queue is associated with a source entity and includes one or more target entities. The online system identifies a cluster of target entities based on a distance between the source entities and entities of the cluster of target entities. The online system selects a subset of target entities from the identified cluster using a machine learning based model trained to determine a score between an input source entity and target entity. The online system modifies one or more queues from the plurality of queues to optimize the aggregate score.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

System Environment

One embodiment of a disclosed system, method and computer readable storage medium that includes an online system (and method and non-transitory computer readable storage medium comprising stored instructions for execution by one or more processors) to enable matching between source entities and target entities. The source and target entities may be computing systems, organizations, users, and so on. The online system matches source entities and target entities to optimize an aggregate score across a plurality of source entities and target entities. The aggregate score across multiple source entities and target entities is optimized even if the score for a particular pair of source entity and target entity is not optimal. For example, if a queue Q1 comprises target entities identified for a task T1 of a source entity SE1, a target entity TE1 that may be the best match for the task T1 of source entity SE1 may not be included in the queue and instead included in a queue Q2 for a task T2 of a source entity SE2 if including target entity TE1 in the queue Q2 for the task T2 of the source entity SE2 results in a higher aggregate score across the plurality of source entities and the target entities, even though TE1 would have been a better match for the task T1 of source entity SE1 compared to the target entities currently being matched against the source entity SE1 and included in the queue Q1. In one embodiment, the online system 140 uses one or more machine learning algorithms to score potential results. In some embodiments, the online system 140 reduces the number of evaluations of machine learning models by first reducing the number of results by filtering them through a search system or database, for example, a vector database. In another embodiment, the online system 140 relies on similarity of vectors which represent the many attributes of the source entities and target entities. In some embodiments, a vector similarity search system is utilized to retrieve potential matches.

Figure 1:
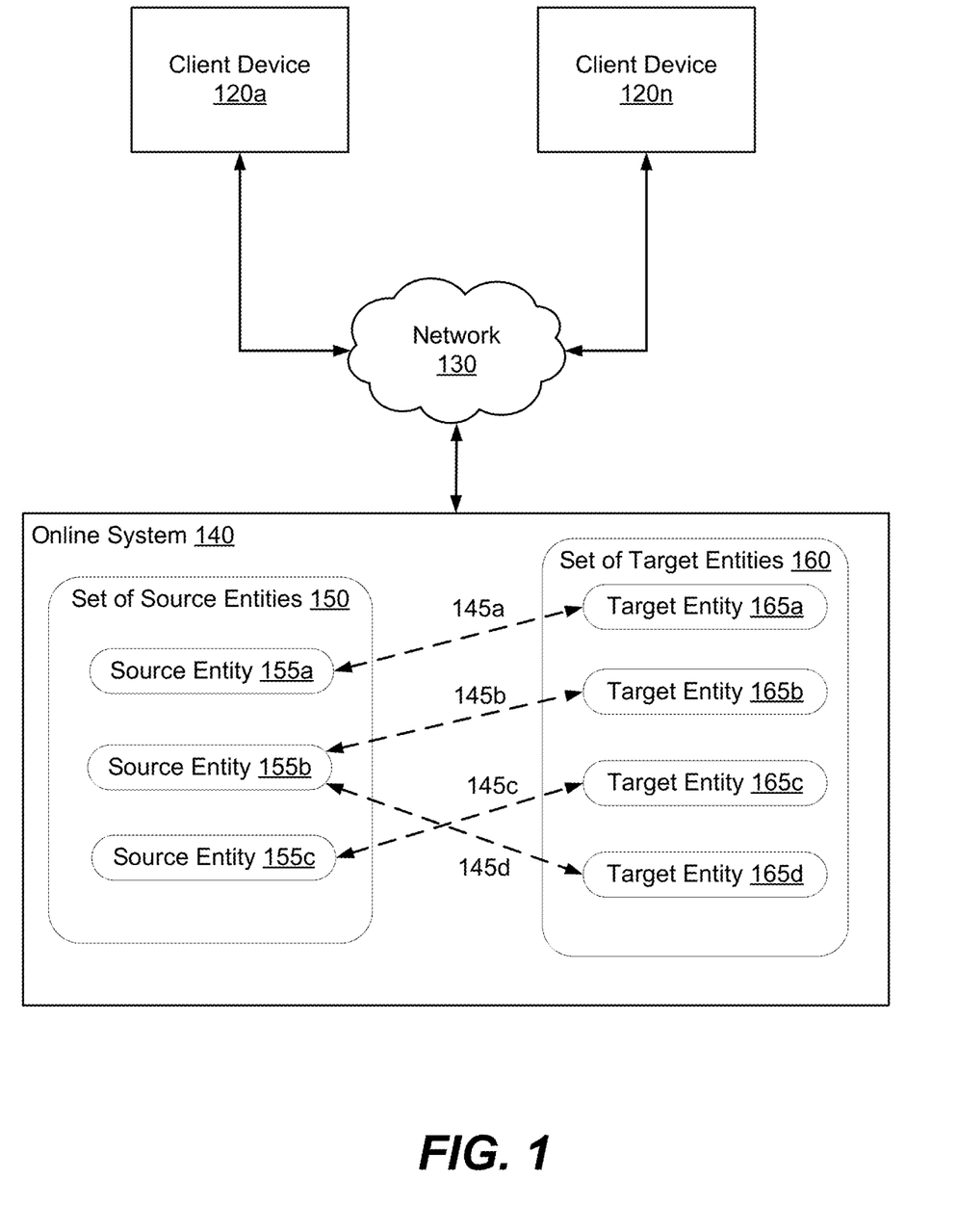
FIG. 1 illustrates an example embodiment of system that performs matching of source entities with target entities in accordance with an embodiment.

FIG. 1 illustrates an example embodiment of system that performs matching of source entities with target entities in accordance with an embodiment. The system environment shown in FIG. 1 comprises one or more client devices 120, a network 130, and an online system 140. Other embodiments may have more or fewer systems than those illustrated in FIG. 1.

The online system 140 receives information provided by users using the client devices 120. According to an embodiment, the online system 140 receives information describing a set 150 of source entities, for example, source entities 155a, 155b, 155c. The online system 140 also receives a set 160 of target entities, for example, target entities 165a, 165b, 165c, 165d. The entities may be computing systems, organizations, users, and so on.

According to an embodiment, each source entity may be associated with a resource. Similarly, each target entity may also be associated with a resource. The online system 140 matches the resources of the source entities with the resources of the target entities to identify matching entities. For example, the source entity may be a cloud computing platform with computing resources and the online system 140 matches target entities representing tenants of the cloud computing platform or any organizations or computing systems of organizations interested in using the computing resources of the cloud computing platform.

According to an embodiment, the online system 140 pairs matching source entities and target entities for performing certain kind of interaction. According to an embodiment, the online system 140 schedules an interaction between a matching source entity 155 and a target entity 165. For example, each of the source entity 155 and the target entity 165 may be associated with a user and the interaction may be an online meeting between the user associated with the source entity with the user associated with the matching target entity.

The client device 120 allows users to interact with the online system 140 via the network 130. The client device 120 can be a personal or mobile computing device, such as a smartphone, a tablet, a laptop computer, or desktop computer. In some embodiments, the client device 130 executes a client application that uses an application programming interface (API) to communicate with the online system 140. The client device 120 presents a user interface that allows the user to interact with the online system 140.

Figure 7:
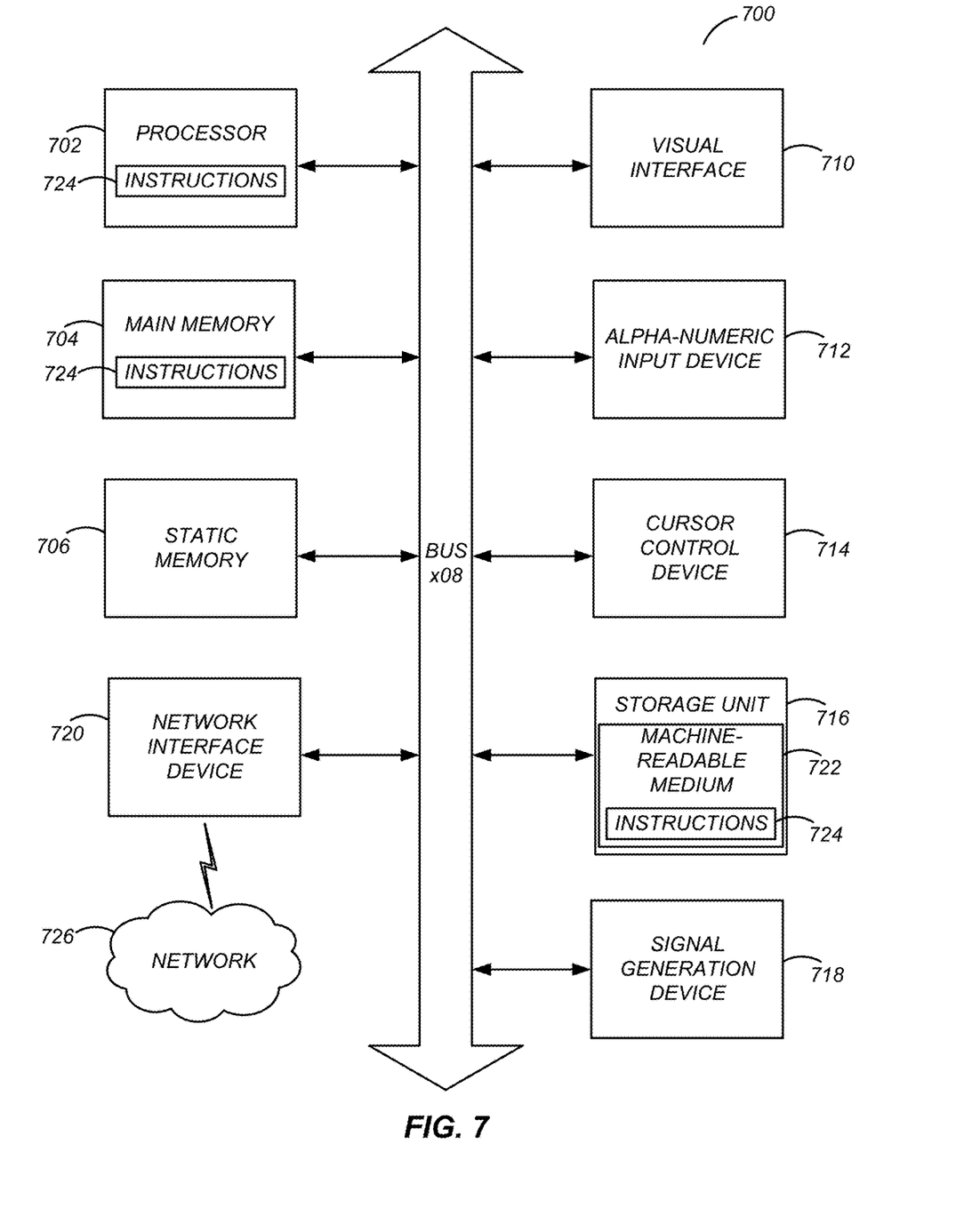
FIG. 7 illustrates an example of a computing device in accordance with an embodiment.

It is noted that the online system 140, and the client devices 130 each may have some or all of the components of a machine as described in FIG. 7. By way of example, the job client device 130 may be a personal computer (e.g., laptop or desktop computer with camera) or a mobile device (e.g., smartphone or tablet with camera).

The client devices 120 and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

System Architecture

Figure 2:
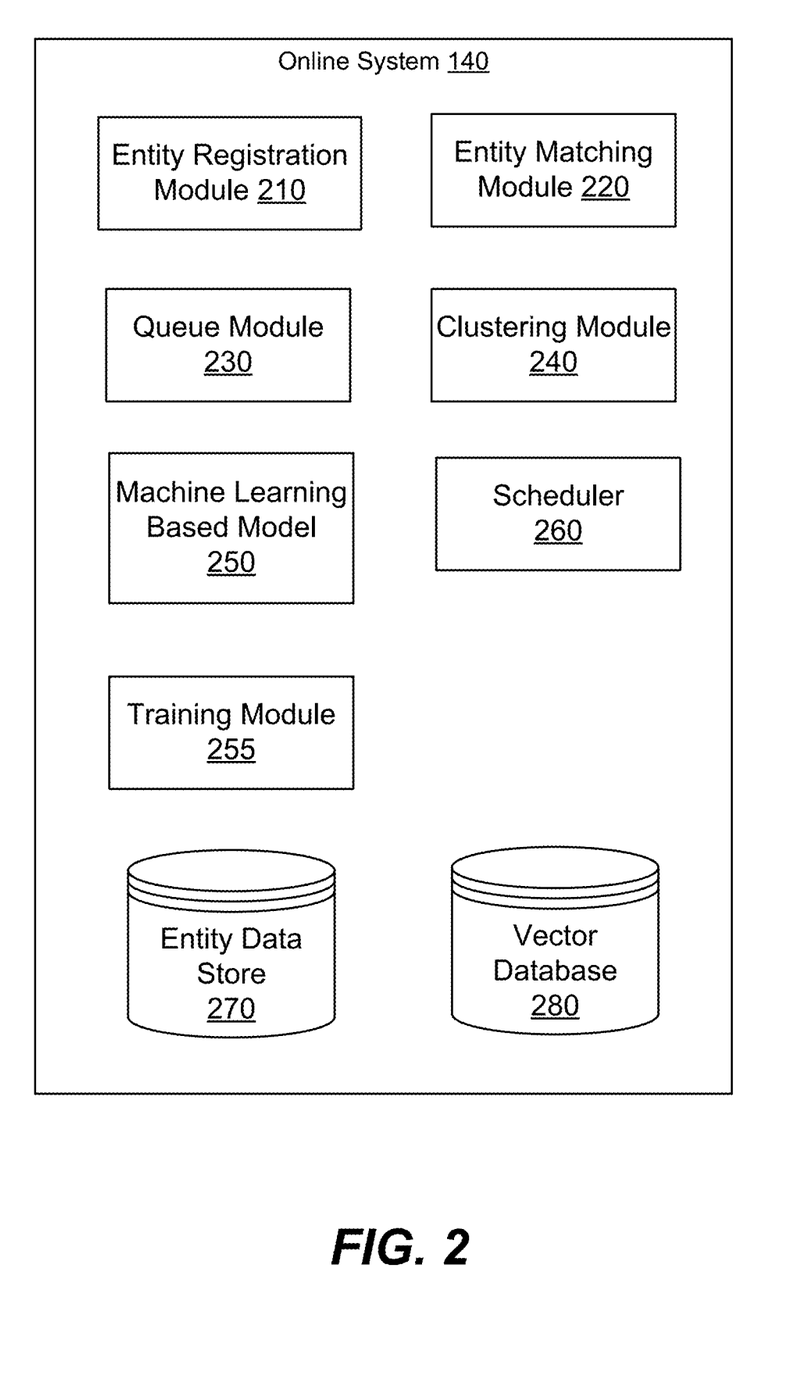
FIG. 2 illustrates example architectural components of the online system illustrated in FIG. 1 in accordance with an embodiment.

FIG. 2 illustrates example architectural components of the online system illustrated in FIG. 1 in accordance with an embodiment. The online system 140 comprises an entity registration module 210, an entity matching module 220, a queue module 230, a clustering module 240, a machine learning based module 250, a scheduler 260, an entity data store 270, and a vector database 280. Other embodiments may include more of fewer modules than indicated in FIG. 2.

The entity data store 270 stores information describing entities. According to an embodiment, each entity has an entity profile comprising attributes describing the entity. For example, an entity may represent a user and the entity profile may include information such as name, contact details (e.g., email, phone, social media), and other user profile attributes (e.g., education, certifications, prior experiences, skills). An entity may represent an organization and the entity profile may include information such as name of organization, location of organization, contact details, and so on. An entity may represent a computing system or a computing platform such as a cloud computing platform and the entity profile may include information such as an internet address of the system, for example, a uniform resource locator (URL), APIs (application programming interfaces) for interacting with the system, authentication mechanisms for connecting with the system, and so on. According to an embodiment, an entity is associated with one or more resources and the entity data store 270 stores information describing the resources. The resources may be computing resources that can be used by other entities. The resources may be tasks associated with a source entity that may be performed by a target entity.

The vector database 280 stores a vector representation of each entity. The vector representation of an entity may be generated by providing the attributes describing an entity to a machine learning model, for example, a neural network such as a multi-layered perceptron and extracting an embedding's representing an output of a hidden layer of the neural network. The vector database 280 computes vector distances between pairs of entities to identify similar entities. The vector distance may be a measure of cosine similarity between two vectors. For example, the vector database 280 may receive a vector representation of a source entity and identify a set of matching target entities that have vector representations within a threshold distance of the vector representation of the source entity. The vector database 280 may receive a vector representation of a source entity and rank various target entities based on their vector distances from the vector representation of the source entity and identify a set of matching target entities that are the closest target entities based on the ranking. The vector database 280 may perform the above operations for any entity, for example, the vector database 280 may receive a vector representation of a target entity and identify a set of matching source entities based on their vector representations as disclosed herein. The vector database 280 is used to identify a subset of entities for performing an initial filtering for shortlisting the target entities that are considered for matching against a source entity. The subsequent matching is performed by the entity matching module 220 using a machine learning model trained to match pairs of entities.

According to an embodiment, a source entity may be associated with multiple resources and the vector database 280 generates and stores a vector representation for each source entity, resource pair. For example, if a source entity has multiple jobs that need to be performed, the vector database 280 may store a vector representation of each source entity, job pair so that matching target entities may be identified for each job of the source entity.

The entity registration module 210 allows entities to register with the online system 140. An entity builds an entity profile by registering with the online system 140. The entity profile of an entity includes various attributes describing the entity that may be used for matching of source entities with target entities. The entity registration module 210 may be configured to provide a user interface for display on a client device 120 and through it receive information describing the entity. The entity registration module 210 may assign a unique identifier for entity or may use a unique immutable attribute (e.g., email or phone) to provide for storage of the entity profile in the entity data store 270. Further data that may be stored with an entity may include availability for an interaction with another entity, for example, for an online meeting such as a video meeting, e.g., best times available for an interview or times that may not work well for interviews. According to an embodiment, a source entity is an organization associated with tasks that a target entity may perform. The entity data store 270 may store information describing the tasks, for example, attributes of entities or users that are qualified to perform the task, location associated with the task, timing of the task, and so on.

The entity matching module 220 performs matching of pairs of entities to generate a score representing a degree of match between the entities. According to an embodiment, the entity matching module 220 performs matching of entities using a machine learning based model 250 trained to match pairs of entities. The entity matching module 220 extracts features describing each entity and provides the features of a source entity and a target entity as input to the machine learning based model 250. The entity matching module 220 executes the machine learning based model 250 to generate a score indicating a degree of match between the source entity and the target entity. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The training module 260 generates the set of parameters for a machine learning model by "training" the machine learning model. Once trained, the machine learning model uses the set of parameters to transform inputs into outputs.

According to an embodiment, the source entity and/or the target entity is associated with a resource and the entity matching module 220 performs matching of entity and resource pairs. Accordingly, the feature vector provided as input to the machine learning based model 250 includes attributes of the resource. For example, if a source entity has one or more tasks (i.e., jobs) that need to be performed, the feature vector provided as input to the machine learning based model 250 may include attributes describing the job such that the system database machine learning based model 250 outputs a score indicating whether a target entity is suitable for performing a particular job of the source entity.

The training module 255 performs training of the machine learning based model 250. The training module 255 may train the machine learning based model 250 using labelled data that may be generated by users, for example, expert users or using historical data based on past matching that may have been performed manually or using various techniques. The training module 260 may apply an iterative process to train a machine learning model whereby the training module 260 trains the machine learning model on each of the set of training examples. To train a machine learning model based on a training example, the training module 260 applies the machine learning model to the input data in the training example to generate an output. The training module 260 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The training module 260 updates the set of parameters for the machine learning model based on the score generated by the loss function. For example, the training module 260 may apply gradient descent to update the set of parameters.

According to an embodiment, the source entity represents an organization or a user having a task for which the source entity is seeking target entities representing other organizations or users to perform the task. The source entity may also be referred to herein as an employer and the target entities referred to as job seekers. Accordingly, the entity matching module 220 uses the machine learning based model 250 based on entity profile data stored in the entity data store 270 to recommend job postings describing jobs of the source entities to job seekers representing target entities and/or may use the data in the entity data store 270 to recommend target entities representing job seekers to source entities representing employers based on the description of jobs. The machine learning based model 250 may assign weights to certain entity profile attributes for both source entities and target entities to determine a best fit for connecting matching source entities and target entities. For example, factors such as education, skills, experience, and job location and times may be provided particular weights determined based on the training of the machine learning based model 250. Once the machine learning based model 250 identifies matches between job seekers and jobs of an employer, the entity matching module 220 may invoke the scheduler 260 to determine availability for interview and interview timing. The best fit may be a time range for conducting an interview.

The scheduler 260 receives a pair of matching entities, for example, a source entity associated with task and a target entity determined to be suitable for performing the task and schedules an interaction between the source entity and the target entity. The scheduler 250 determines an availability of both the source entity and the target entity and identifies a time interval in which both the source entity and the target entity are available and schedules an interaction, for example, an online meeting such as a video meeting between them. The training module 260 attempts to identify the closest time interval that occurs in the near future for the interaction. This is so because the delay in the meeting may increase dissatisfaction between the users associated with the entities and may also decrease the chances of successfully performing the interaction since one or both of the entities may find a different matching.

The queue module 230 manages a plurality of queues, one for each source entity or ne for each source entity and resource pair, for example, one queue for each job associated with a source entity. The queue module 230 identifies matching target entities and adds them to their respective queues. A target entity may be added to multiple queues. For example, a target entity representing a job seeker may be qualified to handle multiple jobs and may be added to the queues of each of the matching jobs.

The clustering module 240 clusters entities together into multiple clusters, each cluster representing entities that are similar to each other, for example, based on vector distances of vector representations of the entities. A cluster of entities may represent entities that are within a threshold vector distance of each other. This allows the entity matching module 220 to efficiently identify matching entities. The clustering module 240 may store a representative entity for each cluster, for example, a representative entity that represents a median or mode of the vector representations of entities in the cluster. For example, the clustering module 240 may generate clusters of target entities and for a given source entity, identify the closest cluster and user the target entities of the cluster as the initial set of target entities short listed for consideration for a task of the source entity.

Managing Multiple Queues

Figure 3:
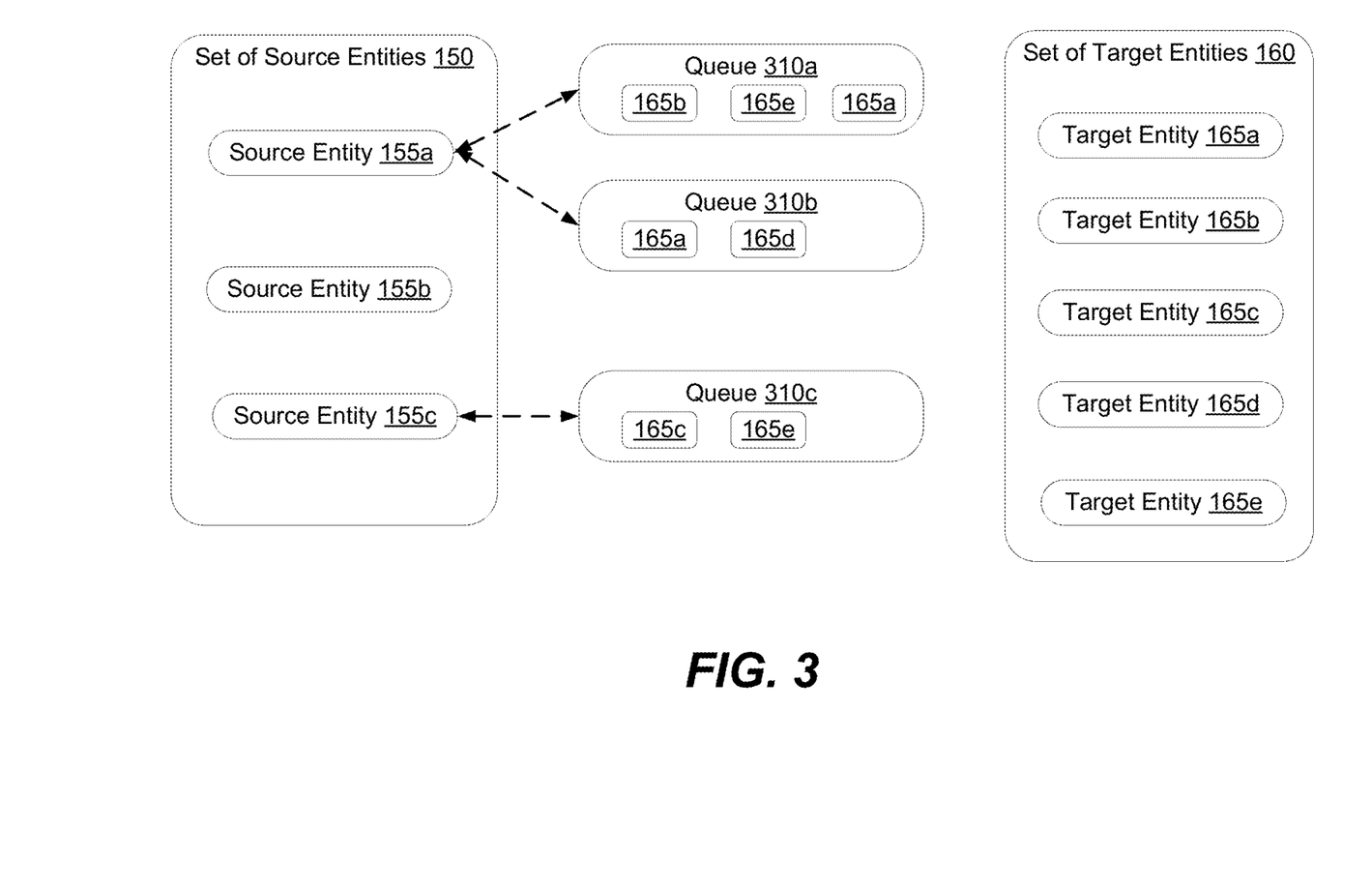
FIG. 3 illustrates management of multiple queues for matching source entities with target entities in accordance with an embodiment.

FIG. 3 illustrates management of multiple queues for matching source entities with target entities in accordance with an embodiment. FIG. 3 shows a set 150 of source entities and a set 160 of target entities. A source entity may have a queue 310 associated with it. A source entity may have multiple resources and a queue associated with each resource. The resource of a source entity may be a compensation that the source entity provides to a target entity that performs a task of the source entity.

For example, the source entity 155*a* may have two tasks T1 and T2 that need to be performed and accordingly has two queues 310*a* and 310*b*, each for identifying a matching target entity for a task, for example, queue 310*a* may be for identifying a matching target entity for performing task T1 and queue 310*b* for identifying a matching target entity for performing task T2. Source entity 155*b* does not have any task to be performed currently or has already identified a matching target entity for any tasks that needed to be performed. Accordingly, entity 155*b* does not have any queue associated with it. Source entity 155*c* may have a single task that needs to be performed and accordingly a single queue 310*c* for identifying matching target entities for performing that single task.

A target entity may be included in multiple queues. For example, target entity 165*a* is included in queues 310*a* and 310*b*, and target entity 165*e* is included in queues 310*a* and 310*c*. A target entity is included in the queue for a source entity if the attributes of the target entity match the resource of the source entity, for example, if the target entity has the required attributes for performing a task of the source entity. A target entity may be removed from all queues once it is assigned to a particular source entity to perform a task of the source entity. The target entity may be kept in a queue associated with a task T1 even after the target entity is assigned to a particular source entity to perform another task T2 if the task T1 needs to be performed at a time that does not overall the time of task T1.

Entity Matching Process

Figure 4:
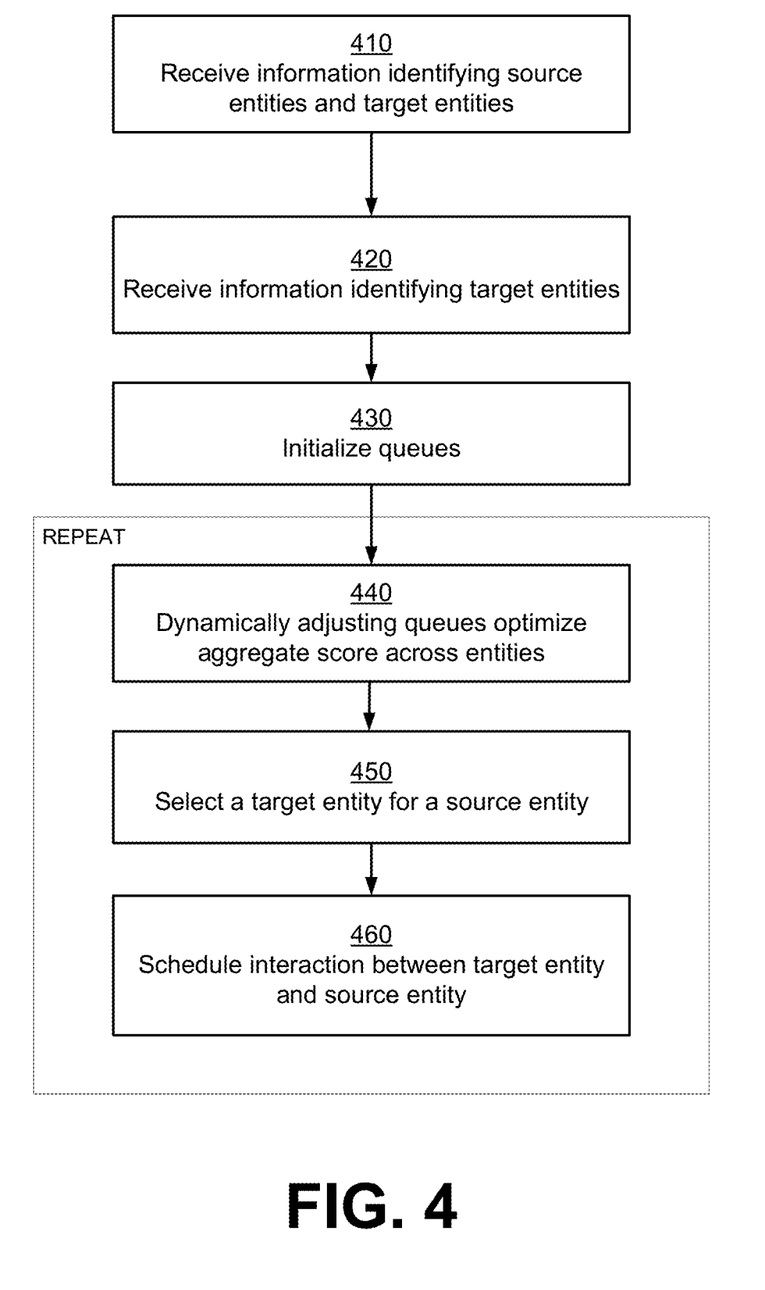
FIG. 4 shows a flowchart of a process for matching source entities with target entities in accordance with an embodiment.

FIG. 4 shows a flowchart of a process for matching source entities with target entities in accordance with an embodiment. The steps of the process may be performed by various modules of the online system 140 as illustrated in FIG. 2. The steps may be performed in an order different from that indicated in FIG. 4.

The online system 140 receives 410 information identifying a plurality of source entities and a plurality of target entities. The online system 140 may store the information in entity data store 270. According to an embodiment, the online system 140 generates vector representations of the source and target entities and stores the vector representations in the vector database 280.

The online system 140 initializes 430 a plurality of queues. The queues are configured to order the elements of the queue based on certain scores. According to an embodiment, each queue is associated with a source entity and includes one or more target entities. A target entity is included in a queue based on matching of the target entity with the source entity corresponding to the queue. A source entity may be associated with multiple queues. For example, if the source entity has a plurality of tasks for which the source entity needs to identify target entities, the source entity may be associated with a plurality of queues, one for each task from the plurality of tasks. The target entities included in a queue match the source entity and the task corresponding to the queue.

According to other embodiments, a queue may be associated with a target entity and may include one or more source entities. In this embodiment, a source entity is included in a queue based on matching of the source entity with the target entity corresponding to the queue. The system maintains the plurality of queues.

According to an embodiment, the target entities are matched against the source entities using the machine learning based model 250 to determine a score indicative of a degree of match with the source entity corresponding to a queue. The target entities may be matched against a source entity and a task corresponding to a queue to determine a degree of match with the source entity and the task corresponding to a queue. If the degree of match as indicated by the score exceeds a threshold, the target entity is included in the queue. The queue is ordered by the score accordingly, a target entity that has a score indicating a higher degree of match to the source entity and the corresponding resource or task if associated with the queue is ahead of another target entity with score indicating a lower degree of match. According to an embodiment, the score of a target entity depends on the time spent by the entity waiting in the queue. For example, if there are two target entities that have similar attributes, the target entity that has been waiting longer is assigned a higher score than the target entity that has been waiting in the queue for less time.

The online system 140 may repeating one or more times the steps 440, 450, 460. The online system 140 may dynamically adjust the queues to optimize an aggregate score across all entities including the plurality of source entities and the plurality of target entities. For example, the online system 140 may modify one or more queues by removing a target entity from a queue and adding the target entity to another queue or moving the position of the target entity within its queue. The online system 140 modifies the queues to optimize an aggregate score across the plurality of source entities and the plurality of target entities.

For a particular source entity, the online system 140 selects a particular target entity from the queue corresponding to the particular source entity. The target entity with the highest score within the queue may be selected as the matching target entity for the source entity.

According to an embodiment, the scheduler 260 of the online system 140 schedules an interaction between the particular source entity and the particular target entity that matched. For example, the scheduler 260 may schedule a video meeting between a user associated with the source entity and a user associated with the target entity.

Figure 5:
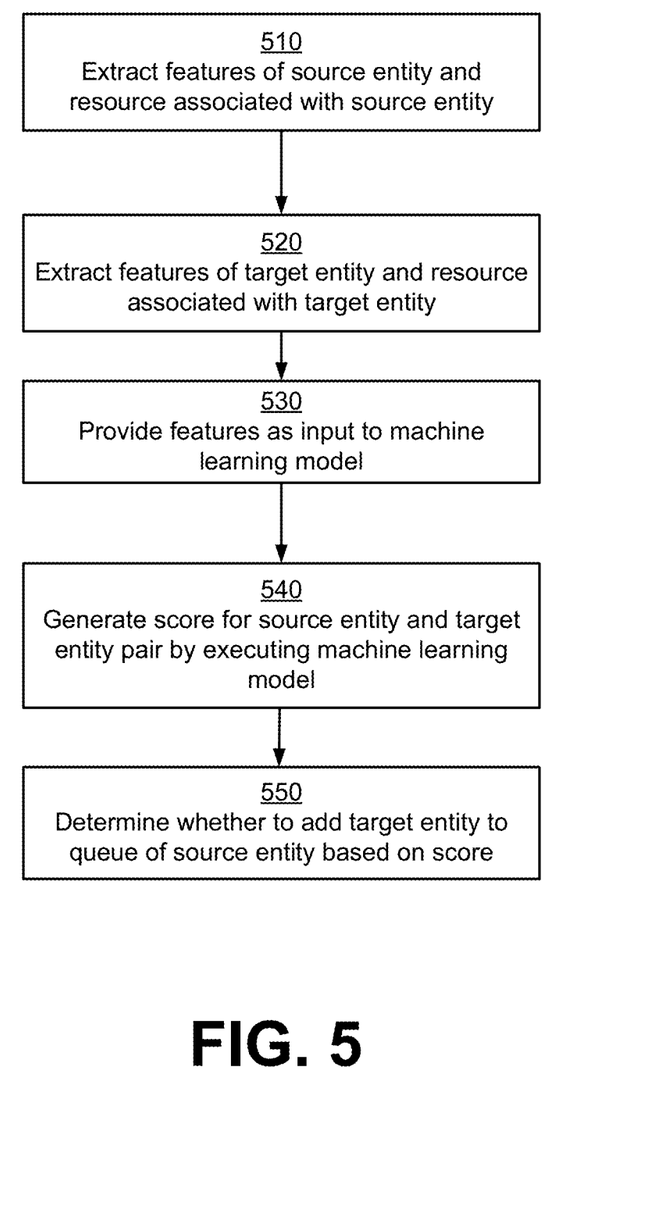
FIG. 5 shows a flowchart of a process for generating a score for a pair of a source entity and a target entity in accordance with an embodiment.

FIG. 5 shows a flowchart of a process for generating a score for a pair of a source entity and a target entity in accordance with an embodiment. The steps of the process may be performed by various modules of the online system 140 as illustrated in FIG. 2. The steps may be performed in an order different from that indicated in FIG. 5.

The entity matching module 220 extracts 510 a feature vector comprising features of the source entity and if necessary, features describing a resource or a task associated with the source entity. For example, if the source entity is an organization having a task that needs to be performed, the feature vector may include features of the organization, for example, the number of people in the organization, the number of groups of the organization, organizational structure of the organization and so on. The feature vector may include features describing a task of the organization, for example, a time interval during which the task needs to be performed, a description of the task, skills needed to perform the task, a location at which the task needs to be performed, and so on.

The entity matching module 220 extracts 520 a feature vector comprising features of the target entity and if necessary, features describing a resource of the target entity. For example, if the target entity is a user that is interested in performing a task for an organization, the feature vector may include features describing a profile of the user, for example, the skills of the user, qualifications of the user, time intervals describing availability of the user, past experiences of the user, a location of the user, and so on.

The entity matching module 220 provides 530 the feature vector comprising the features of the source entity and the target entity as input to a machine learning model 250. The machine learning based model 250 is trained to determine a score between an input source entity and target entity. The score may be referred to as a match score that indicates a degree of match between the source entity and the target entity.

The entity matching module 220 executes the machine learning model to generate 540 the score indicating a matching between the input pair of entities comprising the source entity and the target entity. The entity matching module 220 determines 550 whether to add the target entity to a queue of the source entity. For example, the entity matching module 220 may add the target entity to the queue of the source entity if the score of the target entity exceeds a threshold value. According to an embodiment, the entity matching module 220 may determine whether to add the target entity to the queue of the source entity based on the current elements of the queue. The entity matching module 220 may maintain a threshold size of queues for source entities such that the queue sizes are maintained to be below the threshold size. According to an embodiment, the entity matching module 220 may determine that a target entity should be added to a queue if the score of the target entity exceeds the score of one or more target entities that are currently in the queue. If adding the target entity to such a queue causes the queue to exceed the threshold size, the entity matching module 220 may replace an existing element of the queue with the target element. For example, the entity matching module 220 may add the target element to the queue and remove an existing element, for example, an existing element that has the lowest score for that source entity and task. Note that a target entity may have one score value S1 in a queue Q1 and a different score value S2 in a different queue Q2 depending on how well the target entity matches the corresponding source entities and the resource or task associated with the respective queue.

The disclosed configurations provide for a an automated instant interview system in which job seekers (e.g., interviewees, applicants, candidates) and employers (e.g., recruiters of job seekers) may be aligned for on-demand interviews and post-interview follow-up without a need to separately schedule and call to arrange such interviews. The disclosed configuration beneficially reduces resources, e.g., headcount to arrange interviews and computing resources for communications, and increased time efficiency, e.g., by eliminating wasted time for scheduling interviews, and unnecessarily sifting through communications for scheduling and for interview materials. Moreover, by changing the recruiting paradigm for instant interviews, the job seeker may have additional opportunities for interviews and the employer gains a benefit of being able to meet additional applications within the same or less time than conventional systems. Further, the disclosed configuration increases quality of matches of job seekers and employers by leveraging the machine learning algorithm to immediately feedback on the process and improve factors for matching the two.

Matching System

To create live interaction opportunities between jobseekers and employers, disclosed is a system to match groups of jobseekers with particular job postings by employers.

In one embodiment, the matching system may, given a specific posting, find jobseekers who are the closest matches to the job posting based on their resume, profile, search history, and other engagement data. In one embodiment, the matching system also creates a score to indicate a desired outcome such as a hire, favorable rating by the employer, positive experience of the jobseeker, or other criteria. In one embodiment, the system may also filter out jobseekers who are not online or active or have not responded promptly to a notification either for the current session or in the past.

In another embodiment, the matching system may, given a particular jobseeker's interest in participating in a live conversation, generate matches of employer job postings that are the best choices for that jobseeker. Similarly, that system also may rank or filter based on the attributes and activity information about jobseeker, job posting, and employer. Once such relevance matches are determined, the disclosed system proceeds to determine likelihood of an optimal outcome, for example, a high likelihood that the job seeker will be interviewed and offered a job for subsequent acceptance.

Entity Clustering Process

According to an embodiment, clusters can be created by using unsupervised machine learning techniques that identify common traits among groups of entities. In other embodiments, clustering is performed by calculating the distance between groups of entities by first vectorizing their attributes or generating embeddings from attributes of the entities and then computing the differences between their values to estimate their similarity, thus grouping entities that are near each other in such a space into clusters. In such an embodiment, the system may be configured to proactively match possible pairings of source entities and target entities and prepare queues in advance or enable other systems to contact participants to ensure that they are prepared to participate. By keeping clusters computed in advance, the system may leverage other components, to identify target entities who are in a cluster with high demand but are currently inactive. The system may communicate with those entities, requesting them to participate in order to improve outcomes. Similarly, if there are too few source entities with tasks that need to be performed with large clusters of target entities, the system may encourage those source entities to participate with various incentives.

In one embodiment, the online system 140 estimates the number of active target entities that are interested in connecting with source entities, for example, to interview for certain jobs and a number of source entities who are available to perform interviews. In one embodiment, the online system 140 places such groups into clusters based on their similarity or predicted outcome. The online system 140 may divide the clusters by a simple heuristic relative to type of job and approximate location. In another embodiment, both source and target entities exist in multiple clusters concurrently. Once the clustering has occurred, the system estimates the balance between how many active jobseekers exist in each cluster and how many employers are available to interview. If the system detects or predicts a deviation in the optimal number in each group, it could elect to notify (e.g. by sms, app notifications, email, popup alert, or other method) to encourage participation in the group that has too few participants to achieve optimal outcomes. In another embodiment, the system can offer incentives like discounts or badges to encourage participants to join. When determining the counts of unique participants, since participants can exist in multiple clusters concurrently, the online system 140 could maintain exact counts by using a database or a stateful streaming framework or it can maintain estimated counts by using sampling techniques or algorithms utilizing data structures such as HyperLog.

Figure 6:
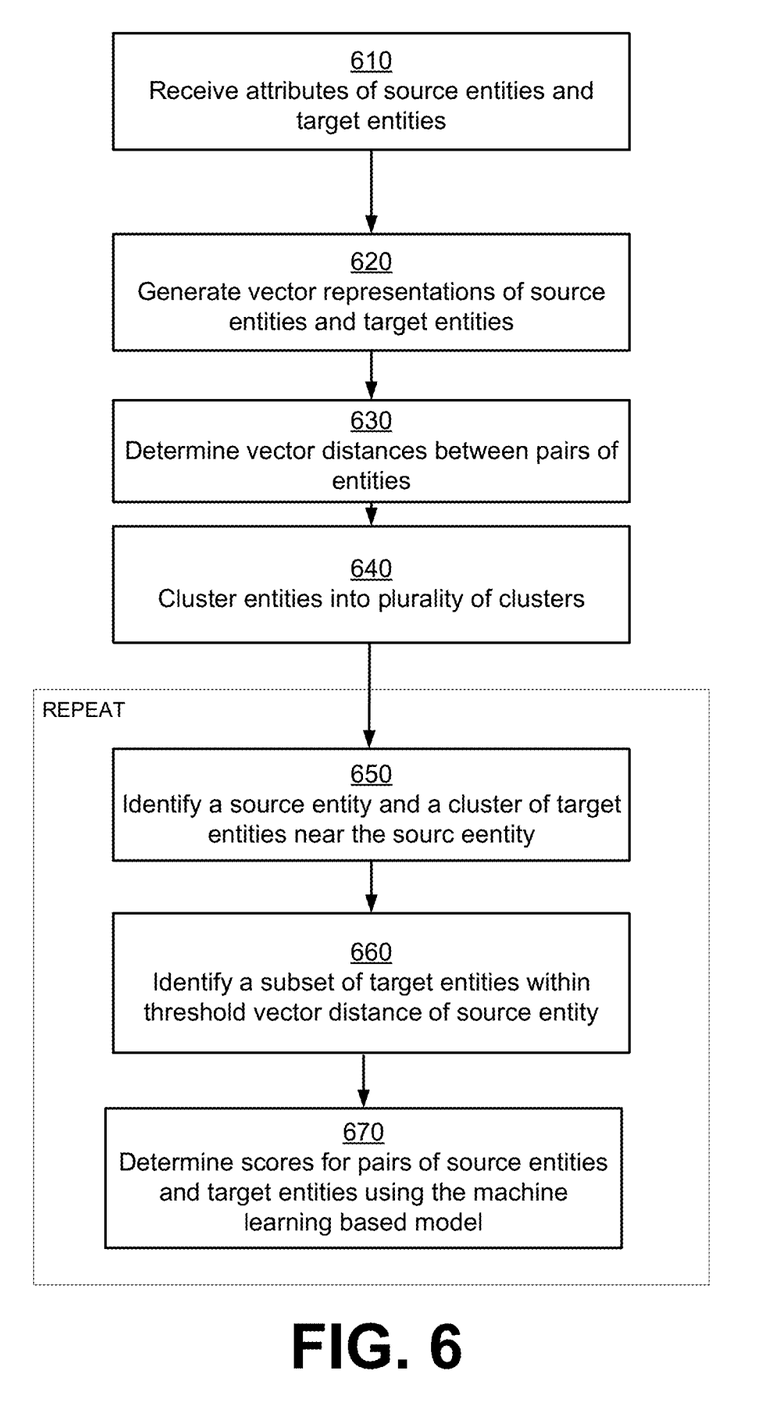
FIG. 6 shows a flowchart of a process for clustering entities in accordance with an embodiment.

FIG. 6 shows a flowchart of a process for clustering entities in accordance with an embodiment. The steps of the process may be performed by various modules of the online system 140 as illustrated in FIG. 2, for example, the clustering module 240. The steps may be performed in an order different from that indicated in FIG. 6. The clusters may be maintained in computer memory, databases, or stateful streaming systems.

The online system 140 receives 610 attributes of entities including source entities and target entities as disclosed herein. The online system 140 generates 620 a vector representation of each entity. The online system 140 may generate a vector representation of an entity by providing the features of the entity including any resources and tasks associated with the entity to a neural network, for example, a multilayered perceptron and extracting embeddings from the neural network. The embeddings represent output of a hidden layer of the neural network, for example the lasty hidden layer of a multilayered perceptron. The vector representation of each entity is stored in the vector database 280.

The clustering module 240 performs clustering 640 of the entities into a plurality of clusters, each cluster representing entities that are close to each other compared to entities of other clusters. The distance between a pair of entities may be measured using a distance metric applied to the vector representations of the pair of entities. The distance metric may represent a cosine similarity metric. According to an embodiment, the clustering module 240 determines a representative target entity for each cluster of entities, for example, a centroid vector of a cluster of entities. The centroid vector may be an aggregate vector determined using the vectors of the cluster, for example, a mean, median, or mode of the vectors of the cluster.

The online system 140 repeatedly performs the steps 650, 660, and 670. The online system 140 identifies a source entity 650. The online system 140 identifies a cluster of target entities near the source entity. The online system 140 may identify a cluster closest to a source entity by comparing the representative vectors of various clusters and selecting the cluster with the closest representative vector. This allows the online system 140 to efficiently filter a set of target entities for further consideration.

The online system 140 may further identifies 660 a subset of target entities within the cluster that are within a threshold distance of the source entity. Alternatively, the online system 140 may process all the target entities of the cluster. The online system 140 provides the source entity and a target entity as input to the machine learning based model 250 to determine scores for pairs of the source entity and target entities short listed. The online system 140 selects the target entities for adding to a queue of the source entity based on the scores generated from the machine learning based model 250.

Generating scores for a pair of source entity and a target entity using the machine learning based model 250 may be a computationally intensive process. The use of clusters of target entities allows the online system 140 to filter a subset of target entities for processing using the machine learning based model 250. As a result, the use of the clustering improves the efficiency of execution of the process of maintaining the queues. Furthermore, the clustering may be performed once for a large number of entities and the result of clustering used for repeated determination of scores for pairs of source entities and target entities using the machine learning based model 250. As a result, the one-time cost of determination of the clusters gets hidden behind the cost of execution of the machine learning based model 250 that occurs multiple times.

According to various embodiments, the online system 140 generates clusters of source entities. The online system 140 receives a target entity and identifies a cluster of source entities that is closest to the target entity. The online system 140 maintains queues for the target entities and uses the identified cluster to select source entities to add to the queue of the target entity.

According to various embodiments the online system 140 determines clusters of source entities and clusters of target entities. The online system 140 determines pairs of clusters of source entities and target entities such that each pair (SC, TV) of a source entity cluster SC and target entity cluster TC represents the closest cluster of target entities to the cluster of source entities. The online system 140 uses the pairs of related source entity clusters and target entity clusters to identify entities for adding to a queue that may be associated with a source entity or a target entity. For example, to populate the queue for a source entity S, the online system 140 identifies the source entity cluster SC to which the source entity S belongs and then identifies the target entity cluster TC closest to the source entity cluster SC and uses the target entities of the target entity cluster TC for populating the queue for the source entity cluster SC.

According to an embodiment, the online system 140 both source entities and target entities can exist in multiple clusters concurrently. Once the clustering is performed, the online system 140 estimates the balance between how many active target entities exist in each cluster and how many source entities are available. If the online system 140 detects or predicts a deviation in the optimal number in each group, the online system 140 may notify users associated with the entity (e.g. by sms, app notifications, email, popup alert, or other method) to encourage participation in the group that has too few participants to achieve optimal outcomes. The online system 140 may offer incentives to users associated with entities like discounts or badges to encourage participants to join.

Queue Processing

In order to create a large system of many concurrent live interactions between source entities and target entities, the online system 140 organizes the collection of source entities and target entities waiting for a video session into many queues. The queues are algorithmically managed to optimize outcomes. In an example scenario, a goal may be to optimize the distribution of source entities and target entities who are waiting to be next for interactions. For example, if one employer who is interviewing for a given job has a very long line where the wait for a jobseeker could be 20 minutes and a nearly identical employer with a nearly identical job opportunity has just connected with an empty queue, shifting some jobseekers from one queue to another would improve the experience for both the jobseekers and the employers and further may increase opportunity for a positive result (e.g., job offer) for both. Moreover, such configuration provides control over the order of participants in their queues based on algorithms that calculate optimal outcomes given a set of goals such as maximizing hires, revenue, satisfaction, or some other target metrics. To enable drive outcomes, the disclosed configuration applies a system of queue curators as further described herein.

In one example embodiment, each employer user computing system creates a queue in response to activation of a live interviewing module. One or more such queues are assigned to a process that evaluates each participant in the queue to determine if they are still active. If the participant (e.g., jobseeker or potential interviewee) is still active, the system calculates or recalculates scores for optimal outcomes and evaluates if there is a better opportunity to move the participant to a different spot in the same queue or another queue for a different employer. Further, either or both jobseekers and employers (or interviewer) could have queues so that jobseekers and employers can be simultaneously eligible for multiple live conversation opportunities.

An example of a queue processing and assignment process is as follows. The online system 140 checks on the state of each queue and the status of all participants in each queue. The online system 140 may perform distribution of processing tasks to multiple computers when there are too many queues and participants for a single computer process to handle. The online system 140 may avoid multiple processes concurrently curating the same queue and so assign one process to one queue curator at a time.

The online system 140 may assign work to queue curators in various ways. According to an embodiment, the online system 140 uses a hashing option to assign queue curators. The online system 140 takes the identifier of the queue participant, such as the id of the job or source entity or the id of the target entity. The online system 140 generates a hashing based on the identifier to produce an integer hash value. The online system 140 uses the hash value for assigning the queue curator.

According to another embodiment, the system assigns queue curators to queues by using a polling technique in which the queue curator polls the queue for new identifiers to check. According to another embodiment, the queue curator uses a streaming application framework that generates identifiers for source or target entities and uses the identifiers (hashed or direct) to partition work among streaming application workers that perform the task of the queue curator.

According to an embodiment, the online system 140 uses various techniques to determine if a participant is active. The online system 140 may use a heartbeat technique wherein a process on the participants browser or mobile device, periodically, over the network, delivers a message (heartbeat message) to indicate that they are still active. Failure to receive such a message one or more times causes the system to determine the participant is no longer active. The online system 140 maintains an active connection over a socket or channel to indicate that the participant is still active. The online system 140 utilizes a secondary process to determine that a participant is not just connected but at their device or desktop by gathering telemetry on factors such as accelerometer if on a mobile device or mouse movements if on a desktop device to determine that in addition to a connection, the participant is not away from their desktop or mobile device. The messages of activity can be delivered alongside a heartbeat message or over an active connection.

According to an embodiment, the online system 140 determines an optimal ordering of entities in queues. The online system 140 generates scores via machine learning techniques or heuristics that determine the likelihood of, for example, participant satisfaction, generating the most revenue, or other goals that have been established for the algorithm. Using such scores, the order of participants may be rearranged in the current queue or move them to a spot in a different queue based on an algorithm that evaluates the optimal score distribution across all applicants and queues. Example techniques are welfare optimization, branch and bound, or simulated annealing.

In one example embodiment, a system of queue arbiters is added whose function is to select the next interaction from among multiple queues or a mixture of queues and fixed time slots. In the case of adding fixed time slots, the system provides for an ability to choose from a set of scheduled live interactions and unscheduled lines of users waiting to speak. In such an embodiment, a queue arbiter would consider whether the next conversation would overlap with one at a scheduled time slot and depending on the extent of the overlap, so long as it's not above some threshold of causing the scheduled conversation to wait too long, would pick the next live conversation from one of the unscheduled queues. Otherwise, it may choose the next scheduled interaction. The structure of multiple queues could enable both a mix of live and scheduled conversations as well as multiple queues that could, for example, represent priority groups based on a priority for the role, should an employer be speaking with candidates for multiple roles or based on other factors such as match quality or likelihood of a favorable outcome.

Application of Entity Matching Process

An application of the techniques disclosed herein is identifying target entities representing candidates for jobs of organizations. A candidate may also be referred to as a job seeker and the organization as an employer. The online system 140 may start by receiving by the entity registration module 210 registration information for candidates and storing in entity data store 270. The online system 140 identifies available jobs in a region, for example, by filtering source entities for a region. The online system 140 may store vector representations of candidates in the vector database 280 and filter candidates based on vector distances. The online system 140 may further filter candidates using the clustering performed as illustrated in FIG. 6. The online system 140 ranks candidates by generating scores for pairs of organizations and jobs with candidates using the machine learning based model 250. The online system 140 may maintain a job queue for each organization and adds matching candidates to appropriate queues with matching jobs. The online system 140 arranges video interviews for candidates by allowing them to interact with representatives of appropriate organizations.

Approximately in parallel (or simultaneously), or in advance, candidates that are logged in may be prepped for the interview process. After login, a candidate may be provided for display on a client device 130 user interfaces to set up a call with the employer interviewer. The user interface may be provided to guide the user on various attributes of the task. The user interface launches a video conference call to connect the candidate and a representative of the organization via video.

According to an embodiment, a representative of the organization (also referred to as an employer) initiates a call request to potential candidates. The candidates may evaluate jobs they may be eligible for. When the candidate logs into the process, the online system 140 sends (or transmits) a notification that indicates the candidate is accepting call requests (or denies them if not). If accepted, the user interface provides for display a prompt page that provides information describing the employer such as employer name, job title, and job details. On the employer side, the online system 140 provides for display a prompt page that includes candidate information such as a profile and/or resume. The candidate waits for the employer to join.

Once the employer and the candidate join, the online system 140 places them in an interview video room to conduct the interview. Once the interview completes, the online system 140 provides for display to the employer a post interview survey that may include information on whether to advance the job seeker to a next round (e.g., more interviews, offer job, or decline). On the candidate side, the online system 140 provides for display a post interview survey that may include information on whether to continue the interview process or not and/or submit additional materials as may have been requested through the interview process.

Computing Machine Architecture

FIG. (Figure) 7 is a block diagram illustrating components of an example machine able to read instructions from a machine-readable medium and execute them in a processor (or controller). Specifically, FIG. 7 shows a diagrammatic representation of a machine in the example form of a computer system 700 within which program code (e.g., software) for causing the machine to perform any one or more of the methodologies discussed herein may be executed. The program code may be comprised of instructions 724 executable by one or more processors 702. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 724 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 700 includes one or more processors 702 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 704, and a static memory 706, which are configured to communicate with each other via a bus 708. The computer system 700 may further include visual display interface 710. The visual interface may include a software driver that enables (or provide) user interfaces to render on a screen either directly or indirectly. The visual interface 710 may interface with a touch enabled screen. The computer system 700 may also include input devices 712 (e.g., a keyboard a mouse), a storage unit 716, a signal generation device 718

(e.g., a microphone and/or speaker), and a network interface device 720, which also are configured to communicate via the bus 708.

The storage unit 716 includes a machine-readable medium 722 (e.g., magnetic disk or solid-state memory) on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for matching entities, the computer-implemented method comprising:
   receiving information identifying a plurality of entities comprising source entities and target entities, wherein an entity is associated with one or more resources;
   for each of the plurality of entities, generating a vector representation;
   storing vector representations of entities in a vector database, wherein the vector database computes vector distances between pairs of entities to identify similar entities using cosine similarity;
   clustering, using the vector database, target entities to generate a plurality of clusters based on vector distances between pairs of target entities, each cluster comprising target entities that are close to other target entities within the cluster compared to target entities of remaining clusters, wherein each cluster has a representative target entity; and
   optimizing an aggregate score across the plurality of entities using a plurality of queues, each queue associated with a source entity and including one or more target entities, comprising:

ranking representative target entities of clusters based on vector distances between a particular source entity and the representative target entities, identifying a representative target entity based on the ranking, identifying a cluster having the representative target entity, of target entities based on a distance between the source entities and entities of the cluster of target entities, selecting a subset of target entities from the identified cluster using a machine learning based model trained to determine a score between an input source entity and target entity, and modifying one or more queues from the plurality of queues to optimize the aggregate score.

2. The computer-implemented method of claim 1, wherein generating the vector representation for an entity comprises:

providing features describing the entity as input to a neural network comprising one or more hidden layers;

executing the neural network; and using an output of a hidden layer of the neural network as the vector representation of the entity.

3. The computer-implemented method of claim 1, further comprising:

for a particular source entity, selecting a particular target entity from the queue corresponding to the source entity; and scheduling an interaction between the particular source entity and the particular target entity.

4. The computer-implemented method of claim 3, wherein a source entity is a first user and a target entity is a second user and the interaction scheduled between the particular source entity and the particular target entity is a video meeting is between the first user and the second user.

5. The computer-implemented method of claim 1, wherein a representative entity for a cluster is a centroid vector of the cluster, further comprising:

determining the centroid vector for each of the plurality of clusters of target entities, wherein identifying the cluster of target entities for a source entity comprises identifying the cluster of target entities with minimum distance between the source entity and the centroid vector of the cluster of target entities.

6. The computer-implemented method of claim 1, wherein modifying one or more queues comprises:

moving one or more target entities across queues, wherein moving the one or more target entities across queues causes an aggregate score of a particular queue to decrease but improves the aggregate score of a plurality of queues.

7. The computer-implemented method of claim 1, wherein a source entity is a first user and a target entity is a second user and a resource associated with the first user is a task and the second user is a candidate for performing the task.

8. The computer-implemented method of claim 1, wherein a source entity is a cloud computing platform having a computing resource of the cloud computing platform and the target entity is a computing system that is a potential user of the computing resource of the cloud computing platform.

9. A non-transitory computer readable storage medium storing instructions that when executed by one or more computer processors cause the one or more computer processors to:

receive information identifying a plurality of entities comprising source entities and target entities, wherein an entity is associated with one or more resources;

for each of the plurality of entities, generate a vector representation;

store vector representations of entities in a vector database, wherein the vector database computes vector distances between pairs of entities to identify similar entities using cosine similarity;

cluster, using the vector database, target entities to generate a plurality of clusters based on vector distances between pairs of target entities, each cluster comprising target entities that are close to other target entities within the cluster compared to target entities of remaining clusters, wherein each cluster has a representative target entity; and optimize an aggregate score across the plurality of entities using a plurality of queues, each queue associated with a source entity and including one or more target entities, wherein instructions for optimizing cause the one or more computer processors to:

rank representative target entities of clusters based on vector distances between a particular source entity and the representative target entities, identify a representative target entity based on the ranking, identify a cluster having the representative target entity, of target entities based on a distance between the source entities and entities of the cluster of target entities, select a subset of target entities from the identified cluster using a machine learning based model trained to determine a score between an input source entity and target entity; and modify one or more queues from the plurality of queues to optimize the aggregate score.

10. The non-transitory computer readable storage medium of claim 9, wherein instructions to generate the vector representation for an entity cause the one or more computer processors to:

provide features describing the entity as input to a neural network comprising one or more hidden layers;

execute the neural network; and use an output of a hidden layer of the neural network as the vector representation of the entity.

11. The non-transitory computer readable storage medium of claim 9, the instructions causing the one or more computer processors to:

for a particular source entity, select a particular target entity from the queue corresponding to the source entity; and schedule an interaction between the particular source entity and the particular target entity.

12. The non-transitory computer readable storage medium of claim 9, wherein a representative entity for a cluster is a centroid vector of the cluster, the instructions causing the one or more computer processors to:

determine the centroid vector for each of the plurality of clusters of target entities, wherein instructions to identify the cluster of target entities for a source entity cause the one or more computer processors to identify the cluster of target entities with minimum distance between the source entity and the centroid vector of the cluster of target entities.

13. The non-transitory computer readable storage medium of claim 9, wherein a source entity is a first user and a target entity is a second user and a resource associated with the first user is a task and the second user is a candidate for performing the task.

14. The non-transitory computer readable storage medium of claim 9, wherein a source entity is a cloud computing platform having a computing resource of the cloud computing platform and the target entity is a computing system that is a potential user of the computing resource of the cloud computing platform.

15. A computer system comprising:
one or more computer processors; and
a non-transitory computer readable storage medium, storing instructions that when executed by one or more computer processors cause the one or more computer processors to:
receive information identifying a plurality of entities comprising source entities and target entities, wherein an entity is associated with one or more resources;
for each of the plurality of entities, generate a vector representation;
store vector representations of entities in a vector database, wherein the vector database computes vector distances between pairs of entities to identify similar entities using cosine similarity;
cluster, using the vector database, target entities to generate a plurality of clusters based on vector distances between pairs of target entities, each cluster comprising target entities that are close to other target entities within the cluster compared to target entities of remaining clusters, wherein each cluster has a representative target entity; and
optimize an aggregate score across the plurality of entities using a plurality of queues, each queue associated with a source entity and including one or more target entities, wherein instructions for optimizing cause the one or more computer processors to:
rank representative target entities of clusters based on vector distances between a particular source entity and the representative target entities,
identify a representative target entity based on the ranking,
identify a cluster having the representative target entity, of target entities based on a distance between the source entities and entities of the cluster of target entities,
select a subset of target entities from the identified cluster using a machine learning based model trained to determine a score between an input source entity and target entity; and
modify one or more queues from the plurality of queues to optimize the aggregate score.

16. The computer system of claim 15, wherein instructions to generate the vector representation for an entity cause the one or more computer processors to:
provide features describing the entity as input to a neural network comprising one or more hidden layers;
execute the neural network; and
use an output of a hidden layer of the neural network as the vector representation of the entity.

17. The computer system of claim 15, the instructions causing the one or more computer processors to:
for a particular source entity, select a particular target entity from the queue corresponding to the source entity; and
schedule an interaction between the particular source entity and the particular target entity.

18. The computer system of claim 15, wherein a representative entity for a cluster is a centroid vector of the cluster, the instructions causing the one or more computer processors to:
determine the centroid vector for each of the plurality of clusters of target entities, wherein instructions to identify the cluster of target entities for a source entity cause the one or more computer processors to identify the cluster of target entities with minimum distance between the source entity and the centroid vector of the cluster of target entities.

19. The computer system of claim 15, wherein a source entity is a cloud computing platform having a computing resource of the cloud computing platform and the target entity is a computing system that is a potential user of the computing resource of the cloud computing platform.

20. The computer system of claim 15, wherein a source entity is a first user and a target entity is a second user and a resource associated with the first user is a task and the second user is a candidate for performing the task.

* * * * *